US010599763B1

(12) United States Patent
Olkin et al.

(10) Patent No.: US 10,599,763 B1
(45) Date of Patent: Mar. 24, 2020

(54) TIME ZONE INTELLIGENT SPREADSHEETS

(71) Applicant: Workday, Inc., Pleasanton, CA (US)

(72) Inventors: Terry M. Olkin, Niwot, CO (US);
Leonard Karpel, Lyons, CO (US);
Brian Sean Morris, Boulder, CO (US)

(73) Assignee: Workday, Inc., Pleasanton, CA (US)

( * ) Notice: Subject to any disclaimer, the term of this patent is extended or adjusted under 35 U.S.C. 154(b) by 391 days.

(21) Appl. No.: 14/868,188

(22) Filed: Sep. 28, 2015

(51) Int. Cl.
*G06F 17/24* (2006.01)

(52) U.S. Cl.
CPC .................. *G06F 17/246* (2013.01)

(58) Field of Classification Search
CPC ....................................... G06F 17/246
USPC ....................................... 715/212
See application file for complete search history.

(56) References Cited

U.S. PATENT DOCUMENTS

2002/0156798 A1* 10/2002 Larue ................ G06F 17/30286

OTHER PUBLICATIONS

Google Apps Script Documentation, at least 2013, available at (1) https://developers.google.com/apps-script/ and (2) https://developers.google.com/apps-script/overview and via archive.org.*
Google Apps Script Documentation, Class ClockTriggerBuilder, at least 2013, available at (3) https://developers.google.com/apps-script/reference/script/clock-trigger-builder and via archive.org.*
"Outlook's Appointments and Time Zones," available via archive.org and at: https://www.slipstick.com/outlook/calendar/appointments-and-time-zones/ (Year: 2013).*

* cited by examiner

*Primary Examiner* — Shawn S Joseph
(74) *Attorney, Agent, or Firm* — Van Pelt, Yi & James LLP

(57) ABSTRACT

A system for time zone intelligent spreadsheets includes a server with a processor. The server is to host a spreadsheet document. The processor of the server is to interpret a time/date data of the spreadsheet document based at least in part on a time zone setting.

18 Claims, 6 Drawing Sheets

TIME ZONE INTELLIGENT SPREADSHEETS

BACKGROUND OF THE INVENTION

Cloud based spreadsheet systems allow users in different locations and time zones to share data and make use of spreadsheet functionality. However, time information is ambiguous for the different users as it is not clear how to interpret a time.

BRIEF DESCRIPTION OF THE DRAWINGS

Various embodiments of the invention are disclosed in the following detailed description and the accompanying drawings.

DETAILED DESCRIPTION

Figure 1:
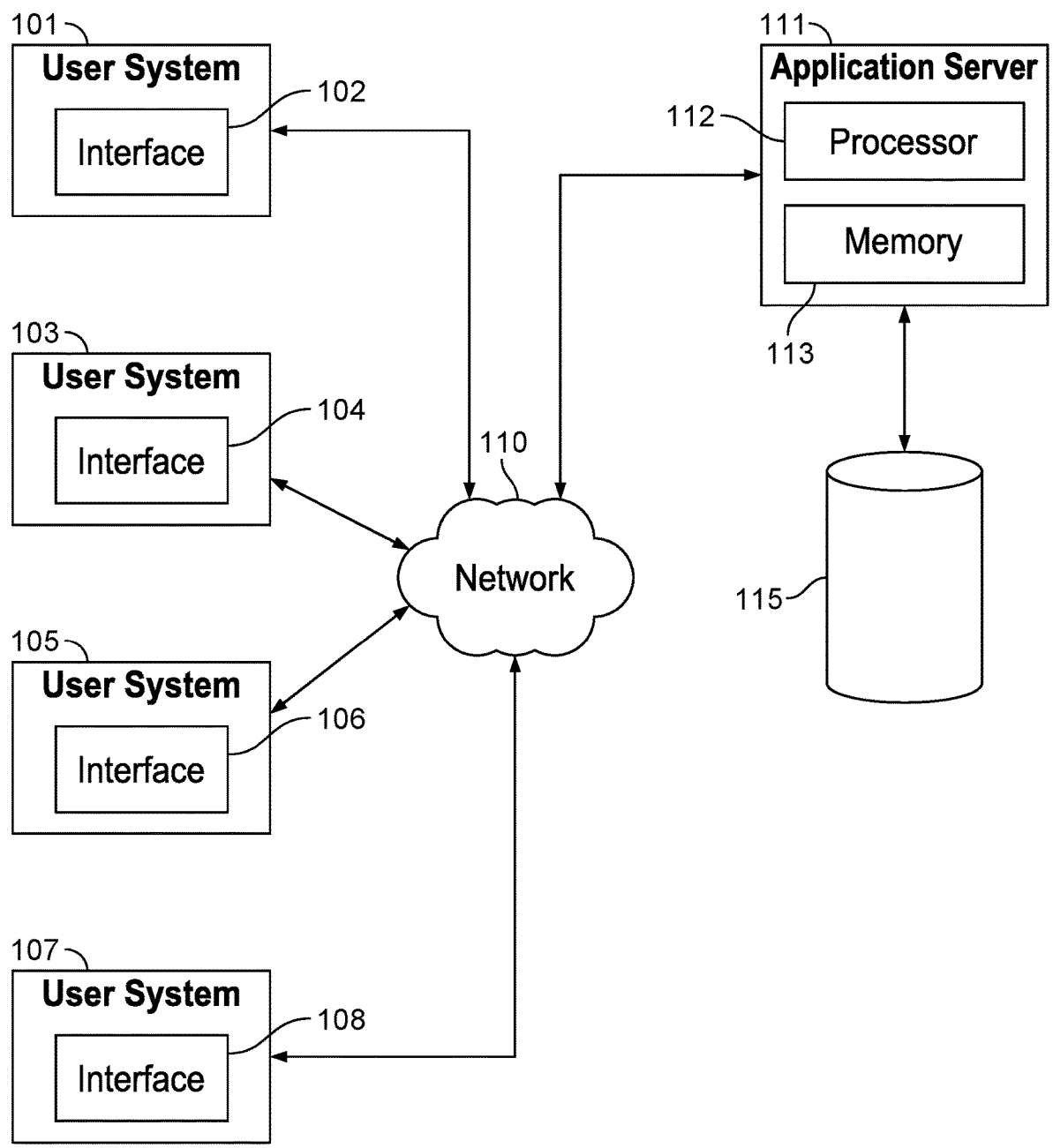
FIG. 1 is a block diagram illustrating an embodiment of a time zone intelligent spreadsheet system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for time zone intelligent spreadsheets is disclosed. The system comprises a server and a processor of the server to interpret a time data of the spreadsheet document based at least in part on a time zone setting. In some embodiments, a memory is coupled to the processor and configured to provide the processor with instructions.

In some embodiments, for a typical spreadsheet implementation, times are independent of a time zone. However, problems arise when a time needs to map to something in the real world or when multiple people are looking at the sheet from different time zones. For example, in the event that a spreadsheet shows that a payment was made at noon—how do you know when the payment was actually made?

In some embodiments, when spreadsheets are running local to a machine by a single user, then the times most probably refer to a local time. But when spreadsheets are running in the cloud, a local time is ambiguous and likely no longer has meaning. This is further compounded when multiple people from different time zones are collaborating over the same sheet.

In some embodiments, typical spreadsheet applications do not recognize dates and times as separate data types. Instead, dates and times are all represented internally as just floating point numbers according to a convention. For example, the format of a time is a number, where the integer part (the number to the left of the decimal) is the number of days since a start time (e.g., Jan. 1, 1900, midnight) and the fractional part (the number to the right of the decimal) is the fraction of the day. So, a value of 5.25 would be Jan. 6, 1900 at 6 am.

In some embodiments, the time zone intelligent spreadsheet system recognizes dates and times as independent values from numbers and has an internal date/time data type used to represent them that includes reference to a specific time zone. The benefit of this is that dates and times are relative to a time zone. Dates and times can further be referenced to the specific time zone. The computer system is made more efficient and has greater clarity compared to other systems.

In some embodiments, a workbook has an associated time zone context such that any date/time entered into a cell or computed by a formula is interpreted based on the time zone context of the given workbook. In the event that a formula references a time in another workbook, the time zone of that other workbook is applied to the time being referenced. In some embodiments, a user is able to change the time zone context of a workbook, but changing the time zone does not automatically update the times in the workbook, they will simply now be in the context of the new time zone when accessed. For example, a data value entry in a cell of "9:23 AM" for a workbook with a time setting of Eastern Time Zone of the United States where the time setting is changed to Pacific Time Zone of the United States—when the time setting is the Eastern Time Zone the time of the cell is interpreted as 9:23 AM Eastern Time and when the time setting is Pacific Time Zone the time of the cell is interpreted as 9:23 AM Pacific Time. In some embodiments, the default time zone for a newly created workbook is the time zone associated with the user who created the workbook (all users in the system have an associated time zone).

In some embodiments, worksheets provide time functions that operate based on a date and/or a time. For example, the SCHEDULE( ) function takes two arguments: a time and an execution argument (e.g., a function call or a formula) to execute. This function queues the function call or formula to be executed at the specified time. The time given is interpreted based on the time zone of the workbook in which the SCHEDULE( ) function resides. Specifically, a formula=SCHEDULE("4-JUL-2020 9:00 pm", FIREWORKS( )) creates a job that runs "FIREWORKS" at 9:00 pm on Jul. 4, 2020 in the time zone of the workbook (e.g., Pacific Time in the US) in which this formula is written. In other words, when a time on a clock (e.g., an internet clock, a reference clock, a system clock, etc.) matches the specified time of the first argument to the SCHEDULE function the second argument will be executed. In various embodiments, the execution argument comprises a function for running a report, pulling data, graphing data, or any other appropriate execution argument. For a specific example:

a first user is in time zone 1, where the first user is the owner/creator of a first workbook and has its time zone setting set to time zone 1, and the first workbook has a cell (e.g., cell A100) with a time value (e.g., 11:00 AM) in it and a cell (e.g., cell A101) with a function call (e.g., =SCHEDULE(A100, FETCH( )));

a first user system is in time zone 2;

an application system is in time zone 3;

The first user, using the first user system, communicates via a network to the application system to use a spreadsheet application; the first user executes a workbook stored by/associated with the application system; the function call (e.g., SCHEDULE) refers to a cell with a time value; the function call receives a clock time for a clock time zone (e.g., from a system clock of the application system associated with time zone 3, from a system clock of the user system associated with time zone 2, from an internet clock requested to be associated with time zone 1, etc.); the clock time is converted to and/or interpreted based on the time zone setting of the workbook (e.g., time zone 1); the function is evaluated with respect to the converted clock time and the cell with the time value (e.g., when they are equal, the SCHEDULE function executes the second argument—for example, a FETCH of data such as Stock Market Data);

a second user is in time zone 4, where the first user has shared access to the first workbook with the second user and the second user has had its time zone setting set to time zone 4, and a second workbook cell (e.g., cell B20) is set to refer to the cell of the first workbook with a time value (e.g., cell A100), and a second workbook cell (e.g., B21) has a function call (e.g., =SCHEDULE(B20, MAKEGRAPH( ));

a second user system is in time zone 5;

The second user, using the second user system, communicates via a network to the application system to use a spreadsheet application; the second user executes a workbook stored associated with/by the application system; the second user views the cell shared by the first user in the second workbook; the time value of the cell in the first workbook is evaluated based on the time zone setting of the first workbook (e.g., time zone 1) and converted to a converted time associated with the time setting of the second workbook (e.g., time zone 4) and displayed in the second workbook as the converted time; the function call (e.g., SCHEDULE) refers to the shared cell with the converted time value; the function call receives a clock time for a clock time zone (e.g., from a system clock of the application system associated with time zone 3, from a system clock of the user system associated with time zone 5, from an internet clock requested to be associated with time zone 4, etc.); the clock time is converted to and/or interpreted based on the time zone setting of the workbook (e.g., time zone 4); the function is evaluated with respect to the converted clock time and the cell with the converted time value (e.g., when they are equal, the SCHEDULE function executes the second argument—for example, the GRAPH of data such as a graph of the value of the S&P 500 index);

Note: the first user workbook times are all evaluated/interpreted/displayed with respect to the time zone setting associated with the first workbook and not with respect to the time zone of the first user system, the application system, or the first user (in the event that the first user time zone is not the same as the first workbook time zone setting);

Note: the second user workbook times are all evaluated/interpreted/displayed with respect to time zone setting associated with the second workbook and not with respect to the time zone of the second user system, the application system, the second user (in the event that the second user time zone is not the same as the second workbook time zone setting), the first user system, or the first user;

In some embodiments, a function NOW( ) returns a current wall clock time according to the time zone setting. In some embodiments, TODAY( ) returns a current date according to the time zone setting. In some embodiments, NOWZT( ) takes a time zone designator argument and returns the time specific to that time zone, independent of the workbook's time zone setting.

FIG. 1 is a block diagram illustrating an embodiment of a time zone intelligent spreadsheet system. In the example shown, application server 111 includes processor 112 and memory 113. Application server 111 is coupled to external storage 115 so that application server 111 is able to store information to and access information from external storage 115. In some embodiments, external storage 115 comprises a database, a cluster of databases, a solid state memory, a hard disc, a redundant array of discs, or any other appropriate storage hardware. In some embodiments, storage for application server 111 uses memory 113 or internal storage comprising a database, a cluster of databases, a solid state memory, a hard disc, a redundant array of discs, or any other appropriate storage hardware. Application server 111 is also coupled to network 110. In some embodiments, network 110 comprises one or more of the following: a local area network, a wide area network, a wired network, a wireless network, the Internet, or any other appropriate network or combination of networks. User system 101, user system 103, user system 105, and user system 107 access application server 111 via network 110. In some embodiments, user system 101, user system 103, user system 105, and user system 107 access an application running on application server 111 (e.g., a spreadsheet document application hosted on application server 111). In some embodiments, a spreadsheet application presents a spreadsheet based on stored data. In some embodiments, the data stored comprises spreadsheet data and metadata. User system 101 includes a user interface 102 used to access application server 111. In some embodiments, user interface 102 is used to access an application running on application server 111. In some embodiments, user interface 102 relies on a web browser to access a spreadsheet application running on application server 111. Similarly, user system 103 includes a user interface 104 used to access application server 111. User system 105 includes a user interface 106 used to access application server 111. User system 107 includes a user interface 108 used to access application server 111.

In various embodiments, application server 111 comprises one or more physical servers with one or more processors, one or more memories, and one or more other storage devices (e.g., hard drives, array of drives, etc.) and/or one or more virtual environments (e.g., virtualization of operating system or application processes) in which an application is executed. In some examples, application server 111 comprises one or more servers that are part of a software as a service (SaaS) platform.

In various embodiments, user systems (e.g., user system 101, user system 103, user system 105, user system 107) are located in a time zone different from a time zone of application server 111 and/or different from each other.

Figure 2:
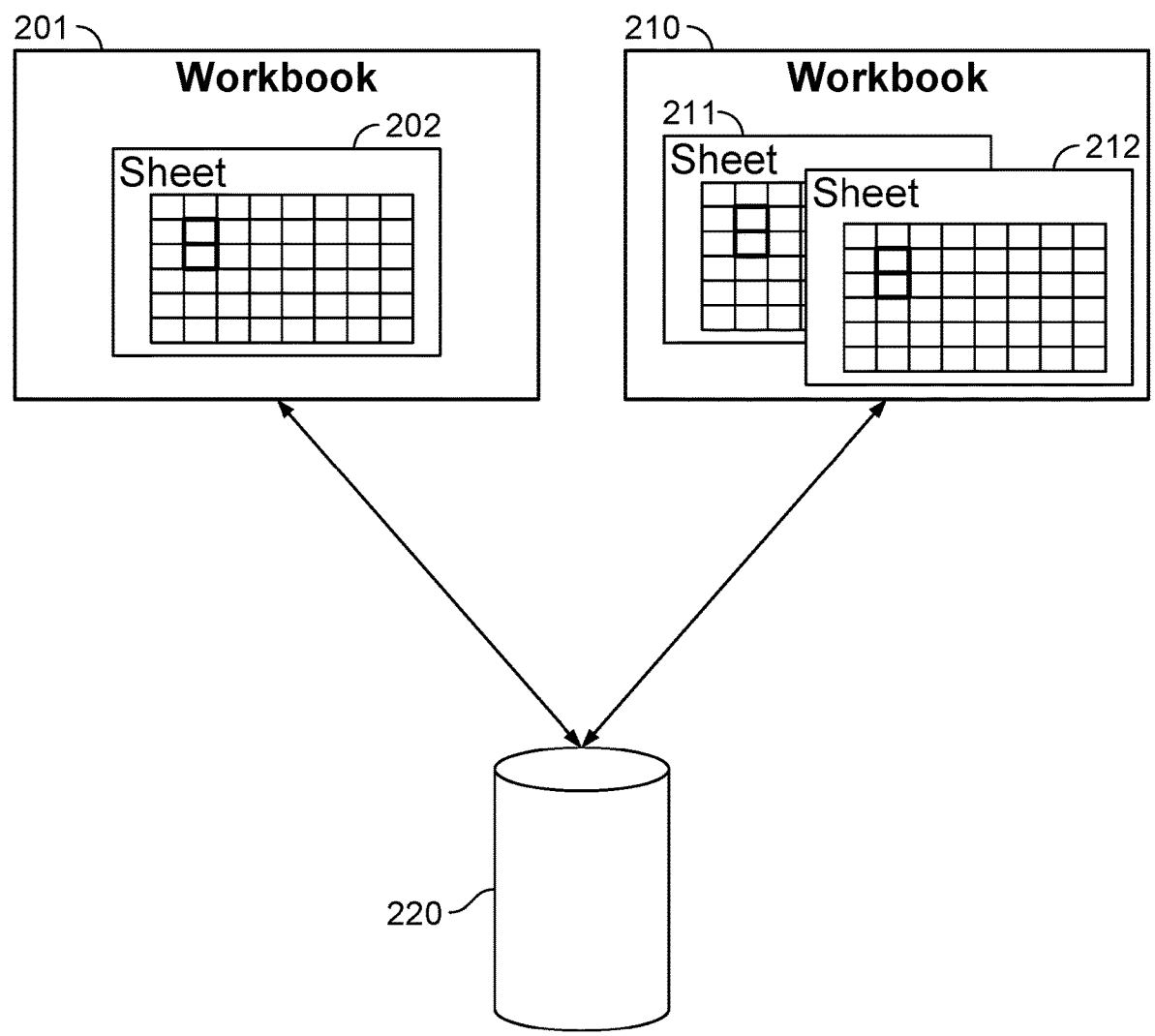
FIG. 2 is a block diagram illustrating an embodiment of a time zone intelligent spreadsheet system.

FIG. 2 is a block diagram illustrating an embodiment of a time zone intelligent spreadsheet system. In some embodiments, the system of FIG. 2 comprises a spreadsheet application executing on application server 111 of FIG. 1. In some embodiments, workbooks 201 and 210 are hosted on application server 111 of FIG. 1. In some embodiments, external storage 220 comprises external storage 115 of FIG. 1. In the example shown, workbook 201 and workbook 210 are two different spreadsheet documents. Workbook 201 includes a single sheet 202. Workbook 210 includes sheet 211 and sheet 212. The data corresponding to workbook 201 and workbook 210, including the data in sheet 202, sheet 211, and sheet 212, are stored in external storage 220. In some embodiments, external storage 220 comprises a remote database, database cluster, or any other appropriate data storage device or system. In some embodiments, a first time/date data, stored in a memory associated with a cell of sheet 202 of workbook 201 that in turn is associated with a first user, is interpreted in the context of the first user's time zone setting; similarly, a second time/date data, stored in a memory associated with a cell of sheet 211 or sheet 212 of workbook 210 that in turn is associated with a second user, is interpreted in the context of the second user's time zone setting. In some embodiments, in the event that the first time/date data is shared with and used by the second user in sheet 211 or sheet 212, the first time/date data is interpreted in the context of the first user's time zone context and is converted to be compared or interpreted within sheet 211 or sheet 212 to be compatible with the second user's time zone context; similarly, in the event that the second time/date data is shared with and used by the first user in sheet 202, the second time/date data is interpreted in the context of the second user's time zone context and is converted to be compared or interpreted within sheet 202 to be compatible with the first user's time zone context.

In some embodiments, conversion of a time/date from one time zone context to another time zone context comprises converting the time/date value to a corresponding time/date value. For example, Sep. 23, 2015 9:45 AM pacific time is converted to Sep. 24, 2015 2:45 AM time in Sydney, Australia, to Sep. 23, 2015 12:45 PM eastern time, or to Sep. 23, 2015 6:45 PM time in Paris, France. In some embodiments, automatic adjustments to time/date for time zone associations and daylight savings times are made during the conversion.

Figure 3:
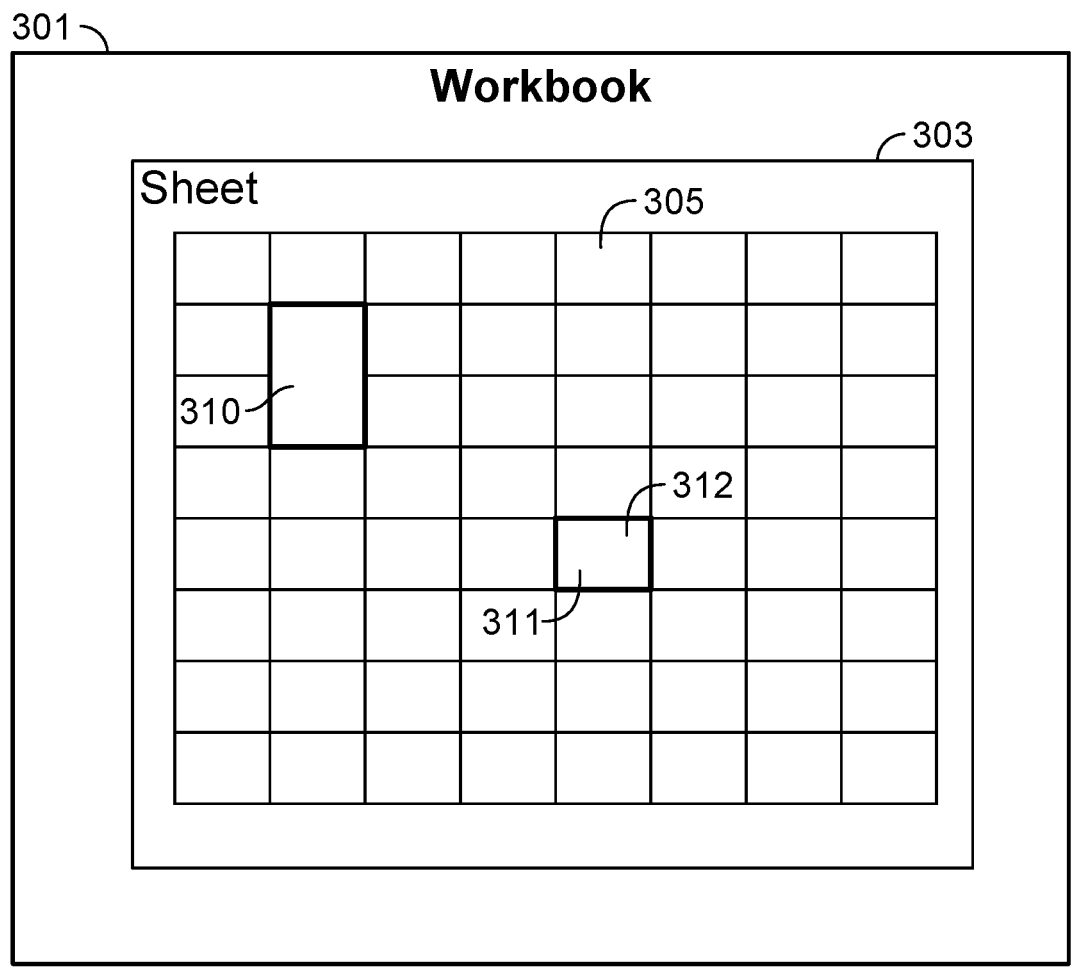
FIG. 3 is a block diagram illustrating an embodiment of a time zone intelligent spreadsheet document.

FIG. 3 is a block diagram illustrating an embodiment of a time zone intelligent spreadsheet document. In some embodiments, workbook 301 is hosted on application server 111 of FIG. 1. In some embodiments, workbook 301 comprises workbook 201 and/or workbook 210 of FIG. 2. In the example shown, workbook 301 includes a sheet (e.g., sheet 303) of a spreadsheet document. Workbooks include one or more sheets. Sheet 303 includes a table of cells 305. Table of cells 305 is arranged in a grid. Table of cells 305 contains two regions (e.g., region 310 and region 311). A region of cells can be both rectangular and non-rectangular. Region 310 is a rectangular region (e.g., a region originally made up of two cells—one cell above another cell—that are merged into a single merged cell). Region 311 is a rectangular region made up of a single cell 312. Cell 312 is a single cell that exists in workbook 301, sheet 303, table 305, and region 311. In some embodiments, region 311 and cell 312 contain a cell value that includes a date/time value. In some embodiments, region 311 and cell 312 contain a formula that includes one or more date/time values and/or one or more operators or functions. In some embodiments, workbook 301 has an associated time zone setting in whose context a time/date data is interpreted—for example, a time/date value of January 1, 12:01 AM with a time zone setting of pacific time in the United States is a different time/date value than January 1, 12:01 AM with a time zone setting of eastern time in the United States. In some embodiments, cell 312 displays a date/time value that is shared from or refers to another workbook; the display of the date/time value is a converted date/time value where the date/time value of the other workbook is converted from being interpreted with respect to the other workbook time zone setting to the time zone setting of the current workbook. For example, a value of 12:30 AM Sep. 26, 2015 for a first workbook with time zone setting of Eastern Time is converted to and displayed as 9:30 PM Sep. 25, 2015 for a second workbook with a time zone setting of Pacific Time, where the displayed date/time of the cell refers to the date/time value in the cell of the first workbook.

Figure 4:
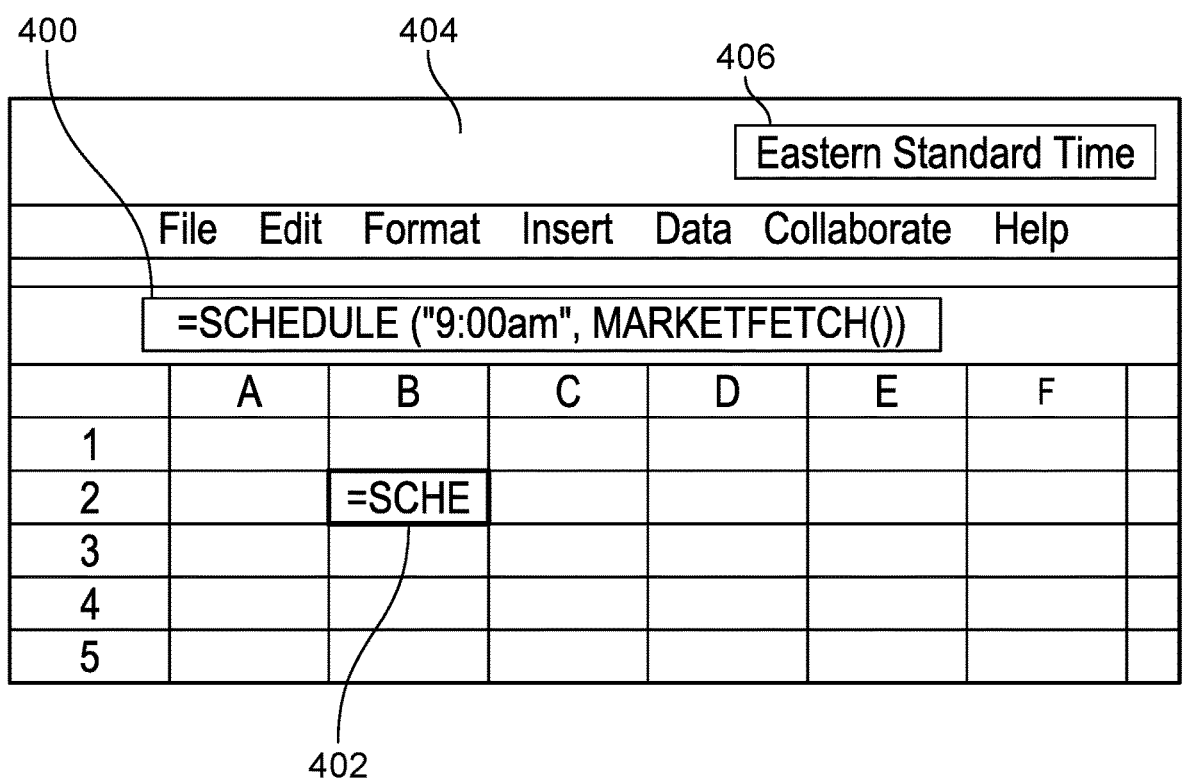
FIG. 4 is a block diagram illustrating an embodiment of a time zone intelligent spreadsheet document.

FIG. 4 is a block diagram illustrating an embodiment of a time zone intelligent spreadsheet document. In some embodiments, workbook 404 is hosted on application server 111 of FIG. 1. In the example shown, workbook 404 includes cell 402 which is highlighted to show a formula in formula window 400 (e.g., "=SCHEDULE("9:00 am", MARKETFETCH( ))"). The time-sensitive function, SCHEDULE( ), triggers at the time in the first argument and executes the second argument (e.g., MARKETFETCH( )). The time in the first argument is interpreted according to the time zone associated with the workbook. The time zone associated with the workbook is displayed in display window 406. The MARKETFETCH( ) function is run at time 9:00 am Eastern standard time. In the event that the time zone associated with the workbook is Pacific standard time, then to run the MARKETFETCH( ) function at 9:00 am Eastern standard time the schedule call is set to "=SCHEDULE("6:00 am", MARKETFETCH( ))" since 6:00 am Pacific standard time is the same as 9:00 am Eastern standard time.

In various embodiments, the SCHEDULE function is used to schedule an event at a specific date and specific time. When combined with the INTERVAL( ) function, a formula can be executed at a specific time every day, at a specific time every week, at a specific time every month, at a specific time every year, at a specific time every decade, at a time every fixed interval (e.g., every x minutes, every y hours, every z days, etc.), or any other appropriate schedule. Since the INTERVAL( ) function does not operate on fixed time/date values, it operates independent of time zone data (i.e., a one hour interval is a fixed time period no matter when the interval takes place).

Figure 5:
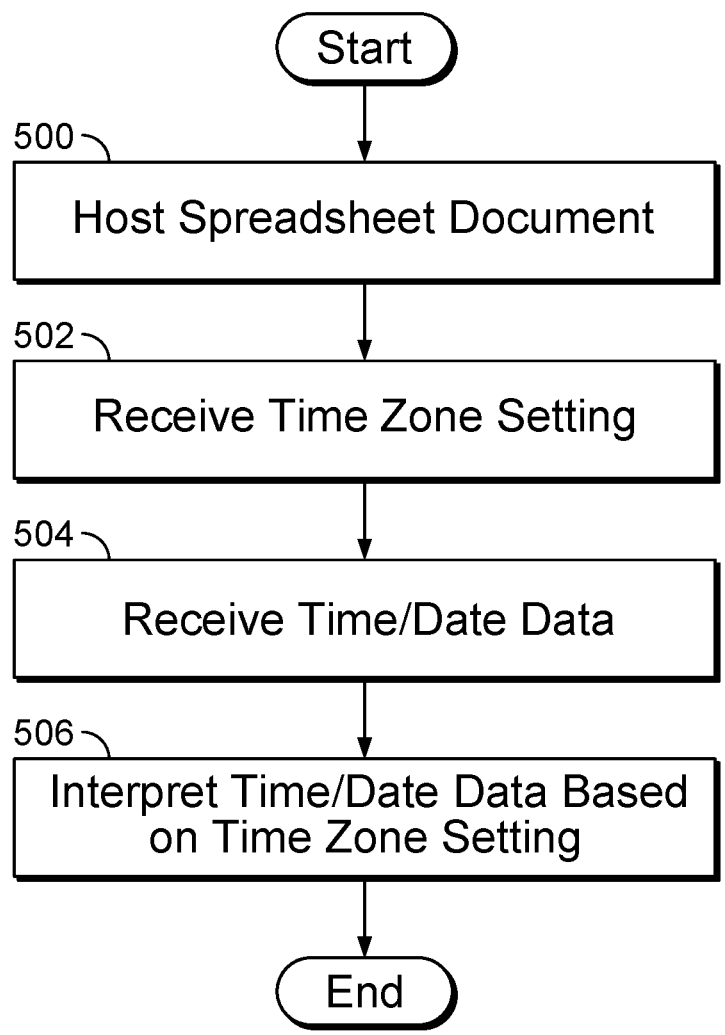
FIG. 5 is a flow diagram illustrating a process for a time zone intelligent spreadsheet system.

FIG. 5 is a flow diagram illustrating a process for a time zone intelligent spreadsheet system. In some embodiments, the process of FIG. 5 is executed by application server 111 of FIG. 1. In the example shown, in 500 a spreadsheet document is hosted. For example, a server runs an application (e.g., a spreadsheet application) that is accessible via a network. In 502, a time zone setting is received. For example, the time zone setting is set to be the same time zone setting as is associated with the user that owns the spreadsheet workbook. In various embodiments, a time zone setting comprises a time zone, a pacific time zone, a mountain time zone, a central time zone, an eastern time zone, or any other appropriate time zone setting. In 504, a time/date data is received. For example, a value is entered in a cell of a worksheet corresponding to a time and/or date. In 506, a time/date data is interpreted based on the time zone setting. For example, a time/date data in a cell of a workbook based at least in part on the time zone setting.

Figure 6:
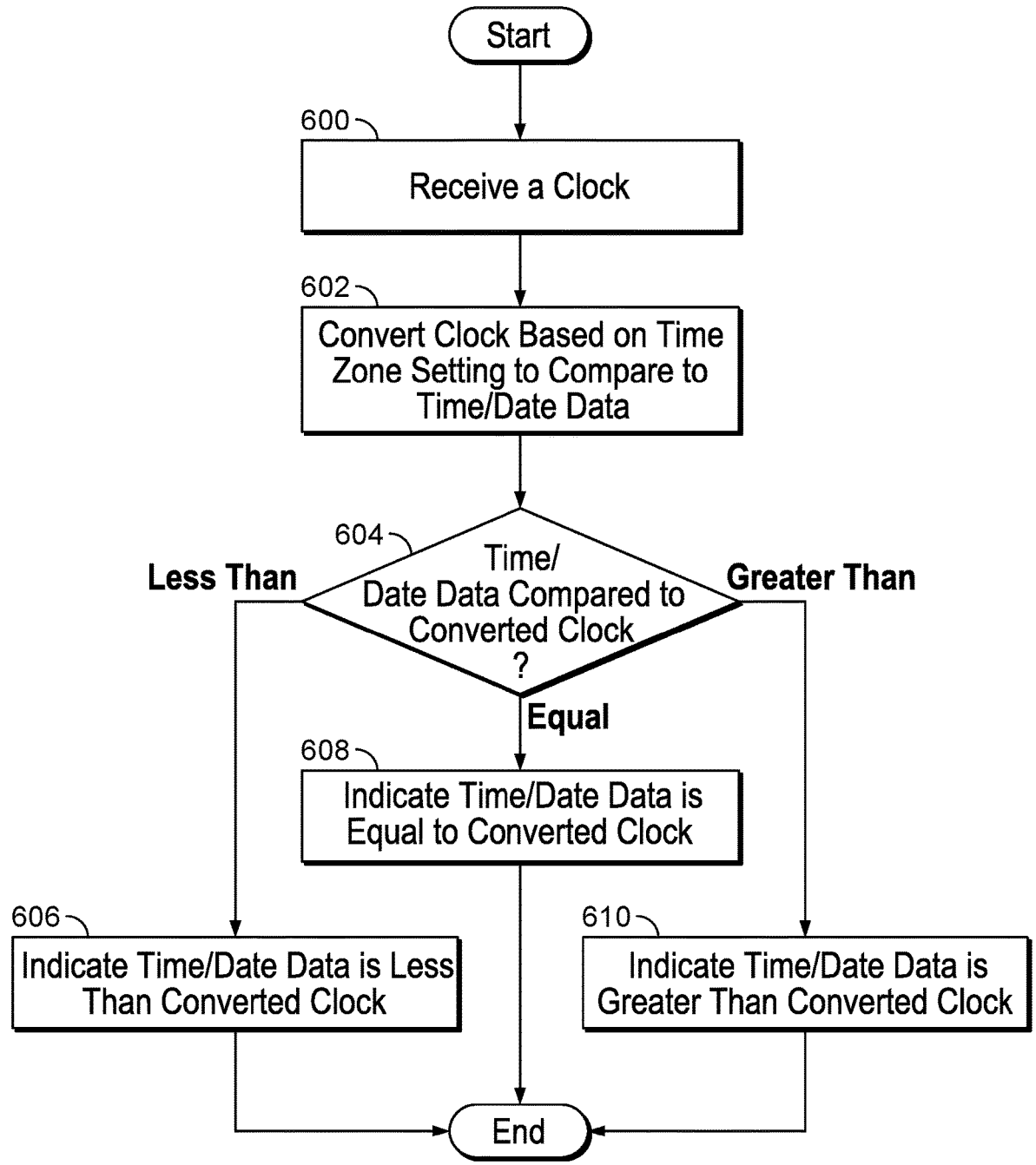
FIG. 6 is a flow diagram illustrating an embodiment of a time zone intelligent spreadsheet system.

FIG. 6 is a flow diagram illustrating an embodiment of a time zone intelligent spreadsheet system. In some embodiments, the process of FIG. 6 implements 506 of FIG. 5. In the example shown, in 600 a clock is received. For example, a clock comprising a reference clock, an internet clock, a system clock is received along with an associated time zone. In 602, the clock is converted based on the time zone setting to compare to the time/date data. For example, the clock is converted to the same time zone as is associated with the workbook. In 604, the time/date data is compared to the converted clock. In the event that the time/date data is less than the converted clock, then in 606 it is indicated that the time/date data is less than the converted clock and the process ends. In the event that the time/date data is equal to the converted clock, then in 608 indicate that the time/date data is equal to the converted clock and the process ends. In some embodiments, a schedule function uses the indication of the time/date data being less than or equal to the converted clock to indicate that a second argument of the schedule function is to execute. In the event that the time/date data is greater than the converted clock, then in 610 indicate that the time/date data is greater than the converted clock and the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for time zone intelligent spreadsheets, comprising:
    a server to host a first spreadsheet document associated with a first user and a second spreadsheet document associated with a second user, wherein a first spreadsheet document cell comprises an original cell shared with the second user, wherein the original cell comprises time/date data, wherein a second spreadsheet document cell comprises a shared cell that refers to the cell of the first spreadsheet document, and wherein the first spreadsheet document and the second spreadsheet document are different spreadsheet documents; and
    a processor of the server to:
        in response to the shared cell of the second spreadsheet document being used by the second user;
            receive a first time zone setting, wherein the first time zone setting is associated with the first spreadsheet document;
            receive a second time zone setting, wherein the second time zone setting is associated with the second spreadsheet document, the second time zone setting being different from the first time zone setting;
            evaluate the time/date data based at least in part on the first time zone setting to obtain an evaluated time/date of the first time zone setting;
            convert the evaluated time/date data of the first time zone setting based at least in part on the second time zone setting to obtain a converted time/date of the second time zone setting; and
            cause display of the converted time/date of the second time zone setting in the shared cell of the second spreadsheet document.

2. The system of claim 1, further comprising an interface to receive the first time zone setting.

3. The system of claim 2, wherein the interface is to receive the time/date data.

4. The system of claim 1, wherein the processor of the server is to interpret the time/date data as an argument to a time function.

5. The system of claim 4, wherein the time function comprises a SCHEDULE function.

6. The system of claim 5, wherein the SCHEDULE function has two arguments.

7. The system of claim 6, wherein a first argument of the two arguments comprises a time/date argument.

8. The system of claim 6, wherein a second argument of the two arguments comprises an execution argument.

9. The system of claim 6, wherein the SCHEDULE function executes a second argument when a clock reaches the time/date data.

10. The system of claim 9, wherein the clock comprises an internet clock.

11. The system of claim 9, wherein the clock comprises a reference clock.

12. The system of claim 9, wherein the clock comprises a system clock.

13. The system of claim 1, wherein the processor of the server is further to determine that the time/date data is less than a converted clock.

14. The system of claim 1, wherein the processor of the server is further to determine that the time/date data is equal to a converted clock.

15. The system of claim 1, wherein the processor of the server is further to determine that the time/date data is greater than a converted clock.

16. The system of claim 1, wherein the first user is an owner/creator of the first spreadsheet document and the second user is an owner/creator of the second spreadsheet document.

17. A method for time zone intelligent spreadsheets comprising:
    hosting a first spreadsheet document associated with a first user and a second spreadsheet document associated with a second user, wherein a first spreadsheet document cell comprises an original cell shared with the second user, wherein the original cell comprises time/date data, wherein a second spreadsheet document cell comprises a shared cell that refers to the cell of the first spreadsheet document, and wherein the first spreadsheet document and the second spreadsheet document are different spreadsheet documents;
    in response to the shared cell of the second spreadsheet document being used by the second user:
        receiving a first time zone setting, wherein the first time zone setting is associated with the first spreadsheet document;
        receiving a second time zone setting, wherein the second time zone setting is associated with the second spreadsheet document, the second time zone setting being different from the first time zone setting;

evaluating the time/date data based at least in part on the first time zone setting to obtain an evaluated time/date of the first time zone setting:

converting the evaluated time/date data of the first time zone setting based at least in part on the second time zone setting to obtain a converted time/date of the second time zone setting; and causing display of the converted time/date of the second time zone setting in the shared cell of the second spreadsheet document.

18. A computer program product for time zone intelligent spreadsheets, the computer program product being embodied in a non-transitory computer readable storage medium and comprising computer instructions for:

hosting a first spreadsheet document associated with a first user and a second spreadsheet document associated with a second user, wherein a first spreadsheet document cell comprises an original cell shared with the second user, wherein the original cell comprises time/date data, wherein a second spreadsheet document cell comprises a shared cell that refers to the cell of the first spreadsheet document, and wherein the first spreadsheet document and the second spreadsheet document are different spreadsheet documents;

in response to the shared cell of the second spreadsheet document being used by the second user:

receiving a first time zone setting associated with the first spreadsheet document;

receiving a second time zone setting associated with the second spreadsheet document, the second time zone setting being different from the first time zone setting;

evaluating the time/date data based at least in part on the first time zone setting and to obtain an evaluated time/date of the first time zone setting:

converting the evaluated time/date data of the first time zone setting based at least in part on the second time zone setting to obtain a converted time/date of the second time zone setting; and causing display of the converted time/date of the second time zone setting in the shared cell of the second spreadsheet document.

* * * * *